No. 660,324. Patented Oct. 23, 1900.
S. W. BULL.
BALL BEARING.
(Application filed Oct. 6, 1899.)
(No Model.)

Witnesses
C. G. Crannell
J. C. Culver

Inventor
Schuyler W. Bull,
By Geo. B. Selden,
Attorney

THE NORRIS PETERS CO., PHOTO-LITHO., WASHINGTON, D. C.

UNITED STATES PATENT OFFICE.

SCHUYLER WAYNE BULL, OF ROCHESTER, NEW YORK, ASSIGNOR OF ONE-HALF TO LEWIS C. TOWER, OF SAME PLACE.

BALL-BEARING.

SPECIFICATION forming part of Letters Patent No. 660,324, dated October 23, 1900.

Application filed October 6, 1899. Serial No. 732,787. (No model.)

*To all whom it may concern:*

Be it known that I, SCHUYLER WAYNE BULL, a citizen of the United States, residing at Rochester, in the county of Monroe, in the State of New York, have invented certain new and useful Improvements in Ball-Bearings, of which the following is a specification, reference being had to the accompanying drawings.

My invention relates to an improvement in ball-bearings whereby the cone is provided with an adjustable washer which excludes dust or foreign substances, while permitting the cone to be adjusted or refitted as often as may be required.

My improvements are fully described and illustrated in the following specification and the accompanying drawings, the novel features thereof being specified in the claims annexed to the said specification.

Figure 2:
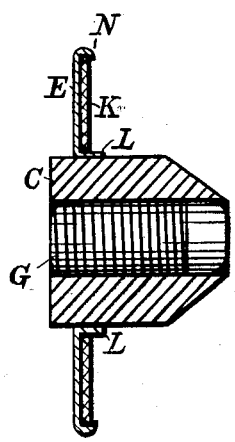
Figure 1:
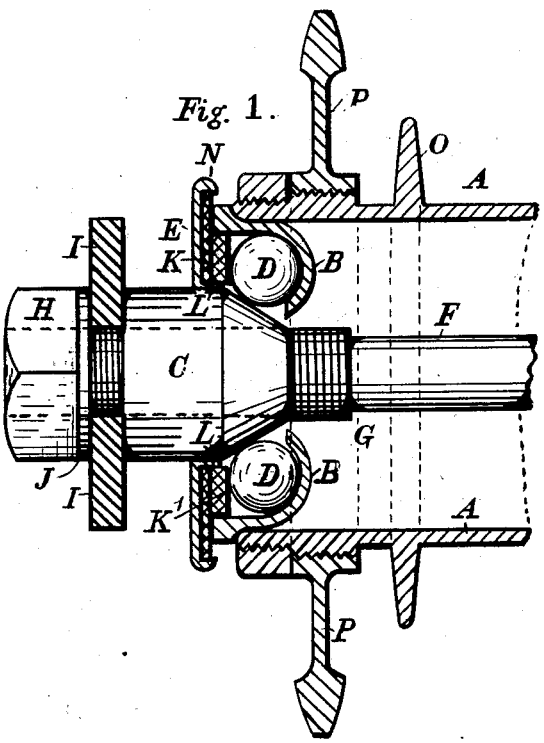
Figure 3:
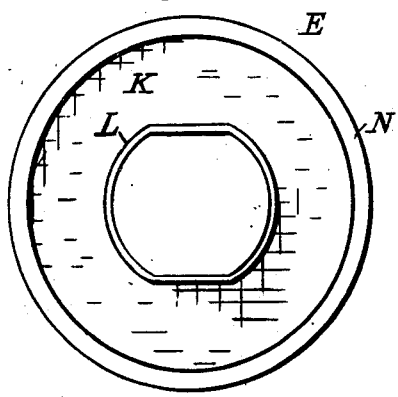
Figure 4:
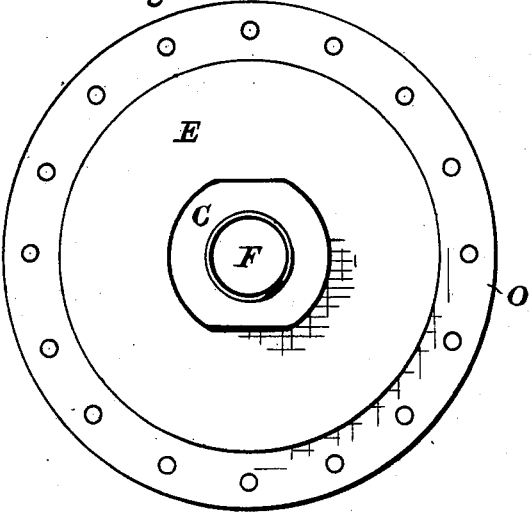
Figures 5, 6:
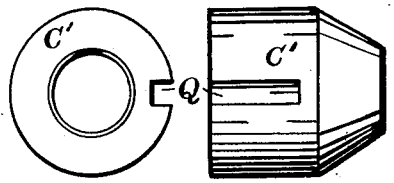

In the accompanying drawings, Figure 1 is a partial longitudinal section of a ball-bearing embodying my invention applied to the rear wheel of a bicycle. Fig. 2 is a section of the cone and washer detached. Fig. 3 is an end elevation of the cone and washer as seen from the inside. Fig. 4 is an end elevation. Figs. 5 and 6 represent a modified form of the cone.

A represents the wheel-hub; B, the cup inserted in the end of the hub; C, the cone; D, the balls, and E the washer, which is made adjustable lengthwise on the cone.

F is the shaft on which the cone is threaded, as indicated at G, and H is a nut which clamps the side frame I I against the outer end of the cone, a washer J being interposed, if desired.

The washer E consists of a sheet-metal disk, provided on its inner surface with a ring K, of felt or other suitable material. The washer is so fitted to the outer surface of the cone that it may be adjusted lengthwise thereon without turning or becoming untrue, the felt ring bearing against the outer edge of the cup or the hub and serving to exclude dust or other injurious material, while at the same time it serves to retain a supply of lubricant.

In the construction shown the cone C is flattened on one or more sides, and the washer E has a perforation of corresponding shape adapted to fit the cone, a flange L being formed on the washer around the opening extending inward, so as to give the washer a firm support on the cone. The washer fits the cone snugly and with sufficient friction to insure its remaining in place in any position lengthwise of the cone to which it may be adjusted. Thus in case it becomes necessary to adjust the cone inward for any reason—wear, refitting, or otherwise—the washer having been pressed thereon, with its inner surface in contact with the cup, it will retain such position until another adjustment of the cone is required, and if it is desired to renew the supply of lubricant to the balls this is readily accomplished by sliding the washer outward. If my improvement be constructed of certain proportions, the balls will be all the time in contact with the felt, or an inner ring K', of felt or other suitable material, may be employed. The edge of the washer E may be turned over the edge of the felt ring K, as indicated at N. It will be observed that my improvement is applicable to a large proportion of the ball-bearings now in use for bicycles, motor-carriages, &c.

O is the ordinary perforated flange for the attachment of the spokes. When my improvement is applied to the rear hub of a chain-bicycle, the hub is provided with the sprocket-wheel P.

In Figs. 5 and 6 I have represented a modified form of the cone C', in which it is provided with a longitudinal slot Q, a form to which in such case the opening in the washer is made to correspond.

My invention is simple and cheap in its application. It is very durable, since it does not employ any springs, and it may be applied to any cone-adjusting hub now in use.

I claim—

1. The combination in a ball-bearing, of the adjustable cone having a flattened side, and a longitudinally-adjustable washer having a flange fitting the contour of said cone and secured thereto through frictional contact therewith.

2. In a ball-bearing, a cone flattened on two sides, and a longitudinally-adjustable washer having a perforation fitting the contour of the cone and secured thereto through frictional contact.

3. In a ball-bearing, a cup having antifriction-balls, a cone adapted to coact with said balls, a longitudinally-adjustable washer frictionally secured to the cone, and a facing of absorptive material for said washer, said facing bearing against a fixed part of the ball-bearing and against the antifriction-balls.

SCHUYLER WAYNE BULL.

Witnesses:
LEWIS C. TOWER,
GEO. B. SELDEN.